United States Patent
McKelvey

[15] 3,675,978
[45] July 11, 1972

[54] ROLLER BEARINGS
[72] Inventor: Ralph E. McKelvey, Louisville, Ohio
[73] Assignee: The Timken Company, Canton, Ohio
[22] Filed: Nov. 12, 1970
[21] Appl. No.: 88,951

[52] U.S. Cl. ............................................................ 308/214
[51] Int. Cl. .......................................................... F16c 33/66
[58] Field of Search ......................................... 308/214, 187

[56] References Cited

UNITED STATES PATENTS

| | | | |
|---|---|---|---|
| 1,945,094 | 1/1934 | Strickland | 308/214 |
| 2,096,321 | 10/1937 | Cox | 308/214 |
| 2,969,263 | 1/1961 | Lamson et al. | 308/187 |
| 3,079,204 | 2/1963 | Lamson et al. | 308/187 |

Primary Examiner—Martin P. Schwadron
Assistant Examiner—Frank Susko
Attorney—Gravely, Lieder & Woodruff

[57] ABSTRACT

A tapered roller bearing has a cone provided with a thrust rib at the large diameter end of the cone raceway. The rib has an abutment face against which the large diameter ends of the rollers in the bearing run so that some of the thrust loads applied to the rollers are transferred to the thrust rib through the abutment face. Either the abutment face or the opposite end faces on the rollers are formed at least in part from a composite material containing a dry lubricant. Should the bearing lose its normal supply of lubricant, the composite material will give up its lubricant and prevent the bearing from failing.

12 Claims, 6 Drawing Figures

PATENTED JUL 11 1972 3,675,978

INVENTOR
RALPH E. McKELVEY
BY Gravely, Lieder & Woodruff
ATTORNEYS.

ROLLER BEARINGS

BACKGROUND OF THE INVENTION

This invention relates in general to bearings and more particularly to roller bearings having improved lubricating means.

In tapered roller bearings tapered rollers are interposed between tapered raceways on a cup and a cone so that as the cup rotates relative to the cone the rollers revolve about the opposed raceways and reduce friction considerably. Indeed, by reason of this rolling contact failure due to heat induced friction rarely occurs along the raceways or along conical surfaces of the rollers. However, in order to position the rollers properly between the raceways on the cup and cone, the cone is provided at the large diameter end of its raceway with a thrust rib against which the large diameter end faces of the rollers bear as the rollers revolve about the cone. This contact is not a rolling contact, but on the contrary, is a sliding contact.

In properly lubricated bearings a thin film of lubricant exists between the thrust rib and the end faces of the rollers. When this thin film of lubricant dissipates, the end faces of the rollers slide directly against the bare surface of the thrust rib, generating considerable friction. In time the friction creates enough heat to weld the rollers to the thrust rib and when this occurs the bearing fails.

The problem is particularly acute insofar as the rotor bearings for helicopters are concerned.

SUMMARY OF THE INVENTION

One of the principal objects of the present invention is to render a tapered roller bearing virtually fail-safe in the absence of its normal lubricating medium. Another object is to provide a tapered roller bearing with an emergency reservoir of lubricant which lubricates areas of relatively high friction when the normal lubricating medium is no longer effective. A further object is to provide a tapered roller bearing of the type stated which is simple in construction and easy to manufacture. An additional object is to provide a bearing which is suitable in machines where the condition of the bearing is critical to the operation of the machine. These and other objects and advantages will become apparent hereinafter.

The present invention is embodied in a bearing having a pair of bearing members spaced apart by rollers. One of the members has a rib location adjacent to the end faces on the rollers. Those end faces or the opposite face on the rib may be formed at least in part from a composite material containing a lubricant. The invention also consists in the parts and in the arrangements and combinations of parts hereinafter described and claimed.

DESCRIPTION OF THE DRAWINGS

In the accompanying drawings which form part of the specification and wherein like numerals refer to like parts wherever they occur.

DETAILED DESCRIPTION

Figure 1:
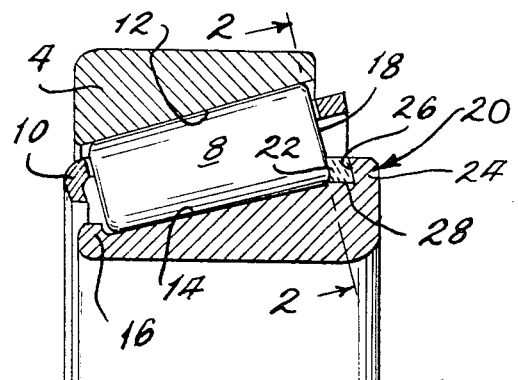
FIG. 1 is a full sectional view of a tapered roller bearing constructed in accordance with and embodying the present invention.
Figure 2:
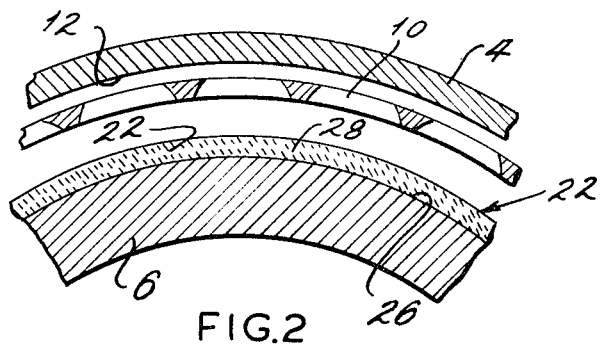
FIG. 2 is a fragmentary sectional view taken along line 2—2 of FIG. 1.

Referring now to the drawings and in particular to FIGS. 1 and 2, 2 designates a tapered roller bearing including a cup 4, a cone 6, a plurality of tapered rollers 8, and a cage 10. The frustoconical surfaces on the rollers 8 engage and roll along opposed tapered raceways 12 and 14 on the cup 4 and cone 6, respectively. The cage 10 fits between the cup 4 and cone 6 and receives the rollers 8, maintaining the proper circumferential spacing between them. The cage 10 also holds the rollers 8 adjacent to the cone raceway 14 when the cone 6 is removed from the cup 4.

At the small diameter end of its raceway 14 the cone 6 is provided with an integrally formed front face rib or retaining rib 16 for preventing the rollers 8 from sliding off of that end of the cone 6 when the cone 6 is withdrawn from the cup 4. However, when the bearing 2 is operating the small diameter end faces of the rollers 8 remain spaced from the retaining rib 16 so that no frictional contact exists between those end faces and the rib 16 as the rollers 8 revolve about the raceway 14 on the cone 6. At the opposite or large diameter end of the raceway 14 where the rollers have their large diameter end faces 18 the cone 6 is provided with a back face rib or thrust rib 20 having an inwardly presented abutment face 22 against which the large diameter end faces 18 of the rollers 8 bear. During operation of the bearing 2, the thrust rib 20 positions the rollers 8 properly between the raceways 12 and 14. When the bearing 2 is properly lubricated a thin film of lubricant exists between the abutment face 22 on the thrust rib and the opposing end faces 18 on the rollers 8.

The thrust rib 20 includes a backing segment 24 which is formed integral with the main body of the cone 6 and inwardly terminates at an oblique face so as to form an annular relief or groove 26 in the cone 6. In addition, the thrust rib 20 includes a composite insert 28 which fills the groove 26, and that insert 28 possesses the abutment face 22 across which the large diameter end faces 18 of the tapered rollers 8 pass.

Generally speaking, the composite material from which the insert 28 is formed contains a binder and a dry lubricant. It may also contain fibers to impart strength to the binder. Preferably, the binder is a suitable plastic base resin which is not affected by lubricating oils sued in the bearing 2. The fibers when used may be glass. The dry lubricant may be one of many produced and classified as such. Preferably, the composite material is injection molded into the annular groove 26 to form the insert 28.

One substance suitable for use as the insert 28 is marketed by E. I. du Pont de Nemours of Wilmington, Delaware, under the trademark Vespel SP–3. This substance contains 85 percent base resin by weight and 15 percent molybdenum disulfide by weight. The base resin is the binder and its exact composition is considered proprietary information by du Pont and, accordingly, is not available. The molybdenum disulfide is the dry lubricant. The Vespel SP–3 resin is injection molded into groove 26 and is not dissolved in, nor does it chemically react with conventional high temperature lubricating oils.

In use, the tapered rollers 8 roll along the raceways 12 and 14 and thereby enable the cup 4 to rotate freely relative to the cone 6. Since the contact between the rollers 8 and the raceways 12 and 14 is purely a rolling engagement, little lubricant is needed on the conical surfaces of the rollers 8 and on the raceways 12 and 14. However, at the large diameter end faces 18 of the rollers 8 the situation is quite different, for the contact between the end faces on the rollers 8 and the opposing abutment face 22 on the composite insert 28 of the thrust rib 20 is sliding in nature and requires constant replenishing of lubricant that is removed by the sliding action. When the bearing 2 is properly lubricated, the large diameter end faces 18 on the rollers 8 will be separated from the abutment face 22 on the thrust rib 18 by a thin film of lubricant.

Should the bearing 2 run dry, or in other words, lose its normal lubricating medium, the end faces 18 on the rollers 8 will bear or run directly against the abutment face 22. Since the abutment face 22 is on the composite insert 28 which contains a dry lubricant, the insert 28 will then supply the lubricant necessary to prevent excessive friction between the end faces 18 of the rollers 8 and the thrust rib 20. In other words, as the end faces 18 on the rollers 8 wipe across the abutment face 22 on the insert 28 the insert 28 wears, and as it wears it releases the dry lubricant to the large diameter end faces 18 of the rollers 8. The dry lubricant in turn supplies the lubrication necessary to avoid excessive friction between the rollers 8 and the thrust rib 20. Consequently, when the bearing 2 loses its normal lubricating medium it will not overheat and fail as would be the case with conventional bearings, but on the contrary the thrust rib 20 and rollers 8 will remain intact and bearing 2 will continue to operate for a substantial time. That time in most applications is usually long enough to shut down the machinery containing the bearing 2 without causing the destruction of that machinery. For example, if the bearing 2 is used as a journal for the rotor of a helicopter, it will function long enough to enable the helicopter to make an emergency landing on suitable terrain. The frustoconical surfaces of the rollers 8 and the raceways 12 and 14 which they engage will not be damaged by the absence of the normal lubricant since the friction generated by the rolling contact is insignificant.

Figure 3:
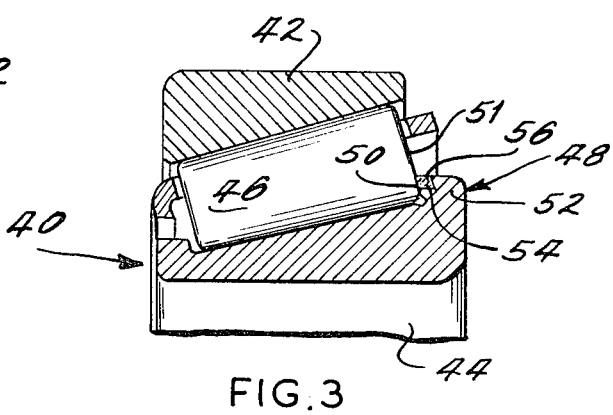
FIG. 3 is a fragmentary sectional view of a modified tapered roller bearing.

Referring now to FIG. 3, it is possible to provide a modified bearing 40 which is very similar to the bearing 2 and includes a cup 42, a cone 44, and tapered rollers 46. The cone 44 likewise has a thrust rib 48 with an abutment face 50 which is wiped by the large diameter end faces 51 on the rollers 46. The thrust rib 48 is composed of a backing segment 52 formed integral with the main body of the cone 44 and a composite insert 54 which fills an annular groove 56 in the backing segment 52. The abutment face 50 is not located entirely on the composite insert 54 as is true in the bearing 2, but instead is located partially on the insert 54 and partially on the backing segment 52.

When the bearing 40 loses its lubricating medium, a portion of which normally exists as a film between the abutment face 50 and the end faces 51 of the rollers 46, the end faces 51 will wipe across the exposed surface of the insert 54 and withdraw the dry lubricant therefrom. The end faces 51 of the rollers 46 will further bring this dry lubricant across the portion of the abutment face 50 located on the backing segment 52 so that the friction between the hard bearing steel of the backing segment 52 and the bearing steel of the rollers 46 does not exceed the amount which will cause the bearing to fail. In this instance both the insert 54 and the backing segment 52 wear as the dry lubricant is released, but the wear is not of the nature which causes immediate destruction of the bearing 40.

Figure 4:
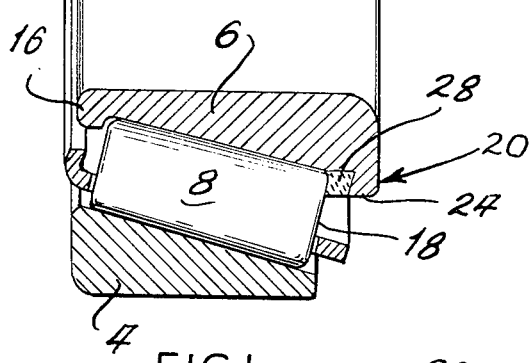
FIG. 4 is a fragmentary sectional view of another modified tapered roller bearing.

Turning now to FIG. 4, it is possible to provide another modified bearing 60 having a cup 62, a cone 64, and tapered rollers 66. The cone 64 has a thrust rib 68 provided with an abutment face 70 against which the large diameter end faces 71 on the rollers 66 bear. The thrust rib 68 is for the most part composed of a backing piece 72 formed integral with the main body of the cone 64, but the backing piece 72 is relieved in the vicinity of the juncture of the abutment face 70 and the cone raceway to form a groove 74 in which a composite insert 76 exists. The abutment face 70, like the abutment face 50 is formed in part from the lubricant bearing composite material of the insert 74 and the hard bearing steel of the cone 64. The insert 74, however, is located along the inner margin of the abutment face 70 instead of along the outer margin as is true of the bearing 40. In the absence of the normal lubricating medium, the insert 74 wears and releases its dry lubricant much in the same manner as does the insert 54 in the bearing 40.

Figure 5:
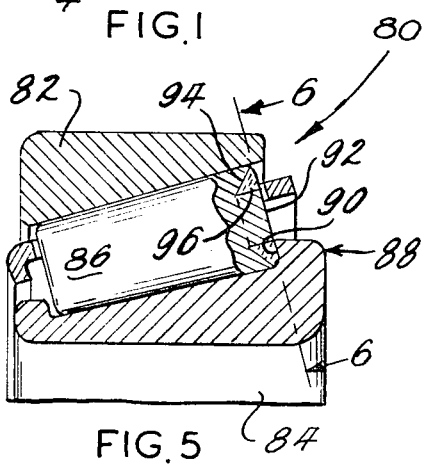
FIG. 5 is a fragmentary sectional view of still another modified tapered roller bearing.
Figure 6:
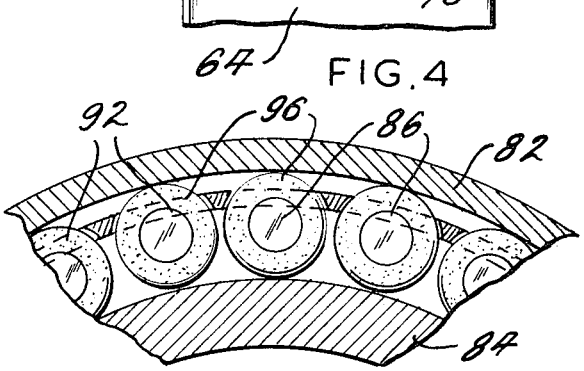
FIG. 6 is a sectional view taken along line 6—6 of FIG. 5.

As will be seen by reference to FIGS. 5 and 6, it is possible to provide still another modified bearing 80 which likewise includes a cup 82, a cone 84, and rollers 86. The cone 84 includes a thrust rib 88 which is formed in its entirety integral with the main body of the cone 84 and includes an abutment face 90 against which the large diameter end faces 92 of the tapered rollers 86 bear.

Each roller 86 has a V-shaped annular groove 94 formed in it with the groove 94 opening outwardly along the periphery of the large diameter end face 92. In other words, the groove 94 opens axially toward the abutment face 90 on the thrust rib 88. Each groove 94 contains a composite insert 96 and the exposed surface on each insert 96 is flush with the hardened steel portion of the roller end face 92.

Should the bearing 80 run dry in use the inserts 96 will wipe the abutment face 90 and give up the dry lubricant contained in them, thus preventing the bearing 80 from overheating and failing.

This invention is intended to cover all changes and modifications of the example of the invention herein chosen for purposes of the disclosure which do not constitute departures from the spirit and scope of the invention.

What is claimed is:

1. A tapered roller bearing comprising a metal cup having an inwardly presented tapered raceway, a metal cone disposed generally within the cup and having an outwardly presented tapered raceway, the cone further having a thrust rib which projects outwardly beyond the large diameter end of the cone raceway and has an abutment surface presented adjacent to that end of the cone raceway, the cone further having an insert therein which is formed from a composite material containing a dry lubricant and forms at least a portion of the abutment surface on the thrust rib, tapered metal rollers interposed between the cup and cone and having tapered side faces engaged with the tapered raceways of the cup and cone and end faces engaged with the abutment surface of the thrust rib, the cone, cup and rollers being in metal-to-metal contact along the raceways for said rollers, and the rollers at their end faces contacting the insert, whereby when the normal supply of bearing lubricant is depleted the composite material gives up the dry lubricant and prevents the bearing from failing.

2. A structure according to claim 1 wherein the rib includes a metal backing segment which extends axially beyond the composite material and resists the thrust exerted on the composite material by the rollers.

3. A structure according to claim 2 wherein the backing segment is formed integral with the main body of the cone.

4. A structure according to claim 3 wherein the abutment face on the rib is formed in part by the backing segment and in part by the composite material.

5. A structure according to claim 3 wherein the abutment face is in its entirety on the composite material.

6. A structure according to claim 3 wherein the backing segment has an annular groove formed in it and the composite material is contained within the groove.

7. A structure according to claim 6 wherein the groove is in the vicinity of the juncture of the abutment face and the cone raceway on which the rollers ride; and wherein the abutment face is formed in part by the metal backing segment and in part by the composite insert.

8. A tapered roller bearing comprising a metal cup having an inwardly presented tapered raceway; a metal cone disposed generally within the cup and having an outwardly presented tapered raceway and a thrust rib projecting beyond the large diameter end of the cone raceway, the thrust rib having an abutment face located adjacent to the large diameter end of the cone raceway, and tapered metal rollers interposed between the cup and cone and having tapered side faces engaged with the raceways of the cup and cone and an end face engaged with the abutment face of the thrust rib, the cone, cup, and rollers being in metal-to-metal contact along the raceways for said rollers, the rollers at the large diameter ends thereof having inserts formed from a composite material containing a dry lubricant, the inserts forming at least a part of the end faces on the rollers and being positioned to pass directly opposite the abutment face on the thrust rib as the rollers roll along the raceways, whereby when the bearing loses its normal supply of bearing lubricant, the composite material of the inserts will give up the dry lubricant and prevent the bearing from failing.

9. A bearing according to claim 8 wherein the rollers have annular grooves which open axially out of the large diameter ends thereof, and the inserts of composite material are in the grooves.

10. A tapered roller bearing comprising first and second metal races having opposed tapered raceways, at least one of the races having a thrust rib at one end of its raceway, the thrust rib projecting beyond the raceway of said race and having an abutment face located adjacent to that raceway, tapered metal rollers interposed between the races and having side faces engaged with the tapered raceways, the cone, cup and rollers being in metal-to-metal contact along the raceways for said rollers, at least one of the engaged faces at the thrust rib being formed at least in part on an insert containing a dry lubricant, and the insert being carried by and rigidly positioned on the component on which it forms a surface, whereby when the bearings normal supply of lubricant is depleted, the composite material of the insert will give up its dry lubricant and prevent the bearing from failing.

11. A structure according to claim 10 wherein the composite material forms at least part of the abutment face on the rib.

12. A bearing according to claim 10 wherein the insert comprises a binder and a dry lubricant.

* * * * *